May 24, 1932.  W. M. CRONK  1,860,174
RIVET GAUGE
Filed Jan. 7, 1931

Inventor
Wesley M. Cronk
By Nooster & Davis
Attorneys.

Patented May 24, 1932

1,860,174

UNITED STATES PATENT OFFICE

WESLEY M. CRONK, OF STRATFORD, CONNECTICUT, ASSIGNOR TO WRIGHT AND CORSON COMPANY, OF MILFORD, CONNECTICUT, A CORPORATION OF CONNECTICUT

RIVET GAUGE

Application filed January 7, 1931. Serial No. 507,170.

This invention relates to new and useful improvements in gauges and has particular reference to gauges for measuring or gauging rivets to determine their number, and also for measuring the thickness of brake linings and clutch facings.

An object of the invention is to provide a gauge for the purpose stated and which is simple in construction being formed from a single piece of material cut and marked with suitable graduations.

Another object is to provide a gauge having recesses of various depths and widths, the recesses being of greatest widths at their entrance ends to accommodate rivet heads of various diameters, the recesses receiving rivet shanks of various diameters and each recess having graduations associated therewith and adapted to be read in connection with the ends of rivets, the heads and shanks of which are of diameters to snugly fit into the recesses, to give the proper number for the rivet.

A further object is to provide a gauge for the purpose and having the characteristics stated and which includes means for measuring the thickness of brake linings and clutch facings and which also includes a scale for measuring the width of brake linings.

Other objects and advantages will become apparent from a consideration of the following description taken in connection with the accompanying drawings wherein a satisfactory embodiment of the invention is shown. However, it will be understood that the invention is not limited to the details disclosed since the invention includes all such modifications as fall within the scope of the appended claims to which reference must be had for a definition of the limitations of the invention.

Figure 1:
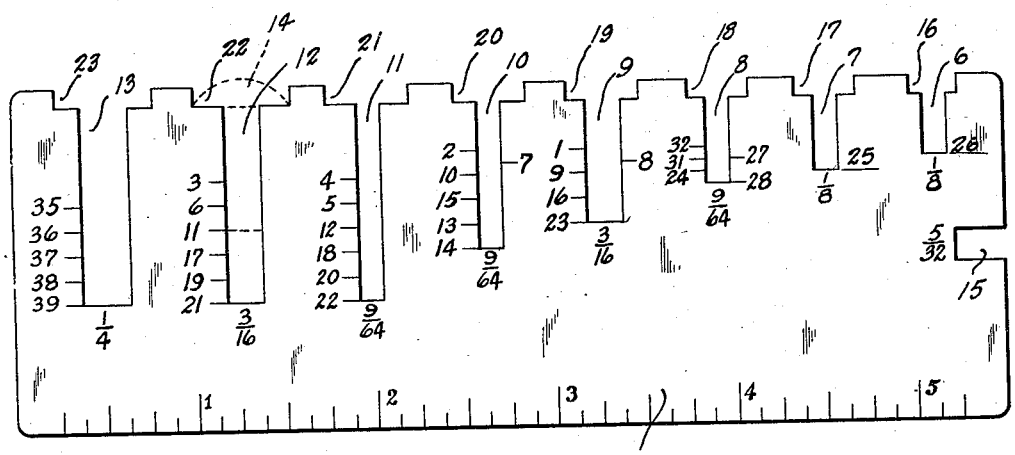
Fig. 1 is a side elevational view of the complete gauge.
Figure 2:
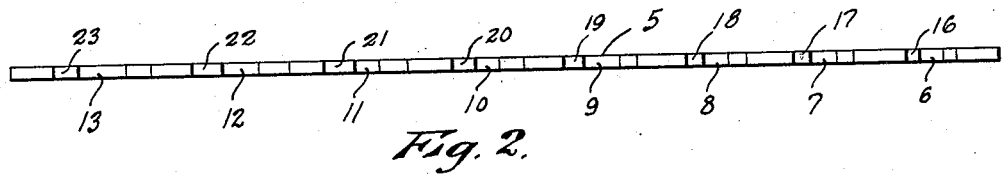
Fig. 2 is a top plan or edge view thereof.

In the trades, rivets are designated by number and each number means a rivet having a given diameter and length of shank and a given diameter of head. In automobile brakes for example, the friction linings are secured to the bands and shoes by rivets and the rivets chosen must be of the proper identifying number since unless the shanks of the rivets are of the proper diameter they will not fit through the openings in the brake bands and shoes. Also unless the heads of the rivets are of the proper diameter they will not fit into the countersinks provided about the openings in the brake bands, shoes or linings, and scoring of the brake drums may result. Further, it will be understood that brake bands, shoes and linings are provided in different thicknesses for different cars and that the rivets used must be of the proper length since otherwise they will either not properly secure the bands to the brake shoes, when the rivets are too short, or else they may be too long and not turn or rivet over properly, whereby scoring of the brake drum may result.

According to the present invention a gauge is provided whereby the operator or mechanic may readily determine the number of a rivet, it being understood that rivets identified by a certain number are used with brake lining of known thickness and width for each make of car. Also, with the gauge of this invention the operator may readily determine the width and thickness of brake linings. Therefore, being equipped with this improved gauge he may determine all that is necessary regarding the material for any particular job.

Referring in detail to the drawings the improved gauge is shown as formed from a flat piece of material, preferably metal, and comprising a body portion 5 having a series of recesses 6, 7, 8, 9, 10, 11, 12 and 13 cut into it from its upper edge. These recesses are of the widths indicated by the markings at their lower or inner ends and certain of the recesses are deeper than others. Each recess has an enlarged or wider outer portion indicated at 16, 17, 18, 19, 20, 21, 22 and 23 respectively.

Associated with the different recesses are markings or graduations corresponding to the designating or identifying numbers of rivets. Recess 6 has but one number "26" associated with it and it is thereby to be understood that a rivet, the shank of which fits snugly within and so is of the same diameter as the width of the restricted portion of recess 6 filling the same, is of the same length as the depth of this recess, and the head of which is the same diameter as the width of the enlarged outer portion 16 of the recess, is that rivet identified in the trade as number "26". A rivet accomplishing the same thing in the recess 7 would be a rivet identified in the trade as number "25".

The other recesses gauge rivets accordingly. For example, recesses 10 and 11 will take a rivet the diameter of the shank of which is 9/64ths of an inch. However, the outer portions or enlarged portions or entrance portions 20 and 21 of these recesses will accept rivets the heads of which are of different diameters, it being obvious that the recess 11 in its outer portion 21 will receive a rivet the head of which is of such diameter that it would not be received in the outer portion 20 of the recess 10.

Therefore, assuming that a rivet shank fits snugly in the restricted portion of the recess 10 but that the head of the rivet will not enter the enlarged portion 20 of said recess then the rivet will be tried in the recess 11 and the shank and head fitting snugly in this recess the graduation opposite the end of the rivet will give its number. A rivet is shown in place in the recess 12 and it will be noted that the head of this rivet fits snugly within the enlarged portion 22 of the recess while the shank fits snugly within the restricted portion of the same. Since the end of this rivet indicated at 14 is opposite the graduation "11" it will be understood that this rivet will be identified in the trade as a #11 rivet.

From the foregoing description it is believed that the operation of the device as a rivet gauge will be fully understood. It is simply necessary to find the recess which is of a width to snugly take the shank and head of the rivet as regards the diameter of the same and that number or graduation opposite the end of the rivet will give the trade-number of the rivet.

The device is also operative as a brake lining and clutch facing thickness gauge, it being merely necessary to insert the edge of the lining or facing into one of the recesses and the reading at the inner end of the recess will give the thickness of the facing or lining when the facing or lining fits snugly in the recess. A recess 15 of a $\frac{3}{32}$ inch width is provided in one transverse edge of the gauge this recess giving an additional reading as regards the thickness of a clutch facing or brake lining. The lower edge of the body 5 or that edge opposite the edge into which the recesses are cut is provided with graduations in inches and fractions thereof whereby the width of a brake lining may be determined. Thus, if a given job calls for a facing of a given thickness and width the operator can easily determine whether any given piece of lining is of the proper width and thickness.

The foregoing description will, it is believed, suffice to make clear the construction and operation of the improved gauge and it will be seen that I have provided a gauge for the purpose stated which is extremely simple in construction and which cannot get out of order and which will withstand an appreciable amount of abuse. Further, it will be seen that the gauge is useful for a number of purposes in connection with the application of brake linings or clutch facings.

Having thus set forth the nature of my invention, what I claim is:

1. In a gauge, a body, said body having a series of recesses therein, certain of said recesses differing as to length and width, said recesses being enlarged at their entrance ends, and said entrance ends being of different widths, and said body being provided with designating marks on the sides of the recesses to indicate the trade number of a rivet corresponding in head and shank diameters to the widths of the recess and length of shank corresponding to the depth of recess to said mark.

2. In a rivet gauge, a body formed of flat material, said body having a series of recesses therein extending from one edge of the body and opening through the sides of the body to expose the sides of rivets inserted into the recesses, certain of said recesses differing as to length and width whereby to receive rivets the shanks of which vary as to length and diameter, and said body having graduations associated with each of the recesses to indicate the identifying number of a rivet fitting into the recesses.

3. In a rivet gauge, a body formed of flat material, said body having a series of recesses therein extending from the edge of the body and opening through the sides thereof to expose the sides of rivets inserted into the recesses, certain of said recesses differing as to length and width whereby to receive rivets the shanks of which vary as to length and diameter, said body having graduations associated with the recesses to indicate the identifying numbers of rivets fitting into the recesses, and said recesses each being of two widths and the portions of the recesses of various widths also differing.

4. In a gauge for the purpose specified, a substantially rectangular body having recesses extending into said body from one of its edges, certain of said recesses differing as to length and width, said recesses being of greatest widths at their entrance ends whereby shoulders are formed below enlarged portions of the recesses adapted to receive rivet heads when the shanks are inserted into the recesses, and said body having graduations associated with the recesses to indicate the identifying numbers of rivets fitting into the recesses.

5. In a gauge for the purpose stated, a substantially oblong body having recesses extending into said body from one of its longitudinal edges, certain of said recesses differing as to length and width, and said body being provided with a scale along the opposite longitudinal edge thereof, said body also having a notch in one transverse edge thereof and graduations associated with each of the recesses to indicate the identifying numbers of rivets fitting into the recesses.

6. In a gauge for the purpose stated, a substantially oblong body having recesses extending into said body from one of its longitudinal edges, certain of said recesses differing as to length and width, said body having markings to indicate the width of said recesses, said body also having a notch in one transverse edge thereof and a marking to indicate the width of said notch, said body being further provided with graduations associated with each of the recesses to indicate the identifying numbers of rivets fitting into the recesses.

In testimony whereof I affix my signature.

WESLEY M. CRONK.